(12) United States Patent
Kogo (10) Patent No.: US 8,596,062 B2
(45) Date of Patent: Dec. 3, 2013

(54) EXHAUST GAS CONTROL APPARATUS AND EXHAUST GAS CONTROL METHOD FOR INTERNAL COMBUSTION ENGINE

(75) Inventor: Tomoyuki Kogo, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 2390 days.

(21) Appl. No.: 10/594,580

(22) PCT Filed: Mar. 31, 2005

(86) PCT No.: PCT/IB2005/000838
§ 371 (c)(1), (2), (4) Date: Sep. 27, 2006

(87) PCT Pub. No.: WO2005/098222
PCT Pub. Date: Oct. 20, 2005

(65) Prior Publication Data
US 2007/0204602 A1 Sep. 6, 2007

(30) Foreign Application Priority Data
Apr. 5, 2004 (JP) ................................. 2004-111251

(51) Int. Cl.
*F02D 23/00* (2006.01)
*F01N 3/00* (2006.01)

(52) U.S. Cl.
USPC ................................. 60/602; 60/280; 60/286

(58) Field of Classification Search
USPC ............................................ 60/602, 286, 280
IPC ................ F02D 23/00,41/38; F01N 3/02, 3/08, F01N 3/20, 3/28; F02B 37/10, 37/18, 37/12, F02B 37/24
See application file for complete search history.

(56) References Cited

U.S. PATENT DOCUMENTS

| 5,211,010 | A  | * | 5/1993 | Hirota ............................. 60/280 |
| 6,370,870 | B1 | * | 4/2002 | Kamijo et al. ................... 60/286 |
| 6,412,276 | B1 |   | 7/2002 | Salvat et al. |
| 6,594,990 | B2 | * | 7/2003 | Kuenstler et al. ............... 60/295 |
| 6,804,952 | B2 | * | 10/2004 | Sasaki et al. .................... 60/284 |

(Continued)

FOREIGN PATENT DOCUMENTS

| DE | 3539578 A1 | * | 6/1986 | ............. F02B 37/12 |
| DE | 3826600 A1 | * | 2/1990 | ............. F02B 37/00 |

(Continued)

OTHER PUBLICATIONS

An English Certified translation Saito et al. (Pub. No. JP 2003-206722 A), published on Jul. 25, 2003.*

(Continued)

*Primary Examiner* — Thai Ba Trieu
(74) *Attorney, Agent, or Firm* — Oliff & Berridge, PLC (57) ABSTRACT

In an exhaust gas control apparatus for an internal combustion engine, including a supercharger which is provided in an exhaust passage at a position up-stream of a catalyst having an oxidizing ability; turbine rotation energy amount adjusting means (106) for adjusting an amount of energy of exhaust gas, which is used for rotating the turbine of the supercharger; and after-injection performing means for performing after-injection, when a work amount of the compressor is increased by the after-injection, the turbine rotation energy amount adjusting means decreases the amount of energy of the exhaust gas, which is used for rotating the turbine, in order to decrease the increased work amount to zero.

9 Claims, 5 Drawing Sheets

(56) References Cited

U.S. PATENT DOCUMENTS

| | | | |
|---|---|---|---|
| 6,895,745 B2 * | 5/2005 | Roby | 60/286 |
| 6,952,920 B2 * | 10/2005 | Shirakawa | 60/295 |
| 7,027,906 B2 * | 4/2006 | Araki | 701/104 |
| 7,043,900 B2 * | 5/2006 | Shirakawa et al. | 60/280 |
| 7,174,706 B2 * | 2/2007 | Kuboshima et al. | 60/280 |
| 2003/0116150 A1 * | 6/2003 | Kobayashi et al. | 123/674 |
| 2003/0182934 A1 | 10/2003 | Adler et al. | |
| 2004/0261414 A1 * | 12/2004 | Araki | 60/602 |
| 2005/0126161 A1 * | 6/2005 | Otake et al. | 60/295 |
| 2005/0223698 A1 * | 10/2005 | Murata et al. | 60/286 |
| 2007/0131203 A1 * | 6/2007 | Ohga | 701/104 |
| 2008/0006024 A1 * | 1/2008 | Tahara et al. | 60/295 |
| 2009/0223221 A1 * | 9/2009 | Onishi et al. | 60/603 |

FOREIGN PATENT DOCUMENTS

| | | |
|---|---|---|
| JP | A-2000-45828 | 2/2000 |
| JP | A-2002-70536 | 3/2002 |
| JP | A-2002-106333 | 4/2002 |
| JP | A-2002-235590 | 8/2002 |
| JP | A-2002-276340 | 9/2002 |
| JP | A-2003-120353 | 4/2003 |
| JP | A-2003-166416 | 6/2003 |
| JP | A-2003-206722 | 7/2003 |
| JP | A-2003-278536 | 10/2003 |
| WO | WO 01/98645 A1 | 12/2001 |

OTHER PUBLICATIONS

An English Certified translation Kobayashi et al. (Pub. No. JP 2003-278536 A), published on Oct. 2, 2003.*

An English Certified translation Nagae (Pub. No. JP 2002-070536 A); published on Mar. 8, 2002.*

An English Certified translation Kawamoto (Pub. No. JP 2003-120353 A), published on Apr. 23, 2003.*

* cited by examiner

EXHAUST GAS CONTROL APPARATUS AND EXHAUST GAS CONTROL METHOD FOR INTERNAL COMBUSTION ENGINE

BACKGROUND OF THE INVENTION

1. Field of the Invention

The invention relates to an exhaust gas control apparatus and an exhaust gas control method for an internal combustion engine. More particularly, the invention relates to a technology for efficiently using energy of the exhaust gas for purifying the exhaust gas.

2. Description of the Related Art

Generally, in an internal combustion engine mounted in an automobile or the like, especially, in a diesel engine, particulate matter (hereinafter, referred to as "PM") such as soot in addition to nitrogen oxide (hereinafter, referred to as "NOx") contained in exhaust gas is required to be removed. In order to satisfy such a requirement, a method is proposed, in which a particulate filter (hereinafter, referred to as a "filter" where appropriate) supporting a storage reduction type NOx catalyst (hereinafter, referred to as a "NOx catalyst" where appropriate) is provided in an exhaust passage of the internal combustion engine.

The NOx catalyst stores NOx in exhaust gas when an oxygen concentration in the exhaust gas flowing therein is high, and releases the stored NOx when the oxygen concentration in the exhaust gas flowing therein becomes low. The filter is formed of a porous base material having multiple pores, and collects PM in the exhaust gas while the exhaust gas passes through the pores. Accordingly, providing the filter supporting the NOx catalyst in the exhaust passage of the internal combustion engine makes it possible to remove NOx and PM contained in the exhaust gas.

If PM is accumulated in the filter, an exhaust path in the filter becomes narrower, and resistance to the exhaust gas flowing through the exhaust path increases. If PM is excessively accumulated in the filter, a pressure of the exhaust gas increases, which causes a decrease in an output from the internal combustion engine. It is therefore necessary to perform a PM recovery process for oxidizing and removing the PM accumulated in the filter so as to recover the PM collecting ability of the filter at the appropriate time.

In the PM recovery process, a temperature of the filter is increased to a value in a high temperature range of approximately 500° C. to 700° C. and an air-fuel ratio of the exhaust gas flowing in the filter is made lean, whereby PM is oxidized and removed.

Fuel used in the internal combustion engine may contain a sulfur (S) component. If such fuel is burned in the internal combustion engine, the sulfur (S) component in the fuel is oxidized to form sulfur oxide (hereinafter, referred to as "SOx"). Therefore, the exhaust gas released from the internal combustion engine contains SOx. If the exhaust gas containing SOx flows in the NOx catalyst, the SOx is stored in the NOx catalyst by the same mechanism as NOx storage. The SOx stored in the NOx catalyst forms stable barium sulfate ($BaSO_4$) with the passage of time. Accordingly, it is difficult to decompose and release the SOx only by decreasing the oxygen concentration in the exhaust gas flowing in the NOx catalyst, and therefore SOx tends to be accumulated in the NOx catalyst.

If an amount of SOx stored in the NOx catalyst increases, the NOx storage ability of the NOx catalyst is decreased, and the ability of removing the NOx in the exhaust gas is decreased. Namely, so-called sulfur poisoning (hereinafter, referred to as "S poisoning") occurs. Therefore, when the NOx catalyst is provided in the exhaust passage of the internal combustion engine, it is necessary to perform a S recovery process for recovering the NOx catalyst from the S poisoning and recovering the NOx removing ability of the NOx catalyst before the NOx storage ability of the NOx is decreased excessively.

In the S recovery process, an ambient temperature of the NOx catalyst is increased to a value in a high temperature range of approximately 500° C. to 700° C., and fuel serving as a reducing agent is added to the exhaust gas flowing upstream of the NOx catalyst and therefore an air-fuel ratio of the exhaust gas flowing in the NOx catalyst is made rich, whereby SOx is released and reduced.

As described above, in the PM recovery process or the S recovery process, the temperature of the filter or the NOx catalyst needs to be increased to a value in the high temperature range of approximately 500° C. to 700° C. Therefore, the temperature of the exhaust gas released from the internal combustion engine and flowing in the NOx catalyst may be increased to a value in a temperature range in which the catalyst is activated, by subsidiarily injecting fuel in addition to performing main fuel injection.

However, in the internal combustion engine including a centrifugal supercharger, even when the temperature of the exhaust gas released from the internal combustion engine is increased, the energy of the exhaust gas is used for increasing a rotational speed of a turbine. Accordingly, the temperature of the exhaust gas flowing in the NOx catalyst cannot be increased sufficiently.

Also, as the energy of the exhaust gas is used for increasing the rotational speed of the turbine and therefore the rotational speed of the turbine increases, a rotational speed of a compressor also increases and an amount of air taken in a cylinder increases. Accordingly, the intake air amount needs to be adjusted by decreasing an opening amount of an intake throttle valve. As a result, a pumping loss of the internal combustion engine increases, which causes deterioration of fuel efficiency.

In order to address this problem, a technology is proposed, in which a variable nozzle provided in the centrifugal supercharger or a wastegate valve is fully opened such that the energy of the exhaust gas is prevented from being used for increasing the rotational speed of the turbine (refer to Japanese Patent Application Publication No. JP-A-2002-276340, for example).

In the technology disclosed in Japanese Patent Application Publication No. JP-A-2002-276340, since the variable nozzle provided in the centrifugal supercharger or the wastegate valve is fully opened, an amount of energy of the exhaust gas, which is used for increasing the rotational speed of the turbine, decreases. As a result, the intake air amount becomes smaller than that before the variable nozzle or the wastegate valve is fully opened, which may cause an increase in an amount of smoke.

DISCLOSURE OF THE INVENTION

It is an object of the invention to provide an exhaust gas control apparatus and an exhaust gas control method for an internal combustion engine, which can efficiently use energy of exhaust gas without deteriorating properties of exhaust emissions.

According to a first aspect of the invention, there is provided an exhaust gas control apparatus for an internal combustion engine provided with a catalyst which is provided in an exhaust passage of an internal combustion engine and which has an oxidizing ability; a supercharger which includes a turbine that is provided in the exhaust passage at a position upstream of the catalyst and that is rotated by exhaust gas and a compressor that is rotated in accordance with rotation of the turbine and that performs supercharging; turbine rotation energy amount adjusting means for adjusting an amount of energy of the exhaust gas, which is used for rotating the turbine; and after-injection performing means for performing after-injection for injecting fuel after main fuel injection in order to increase a temperature of the exhaust gas released from the internal combustion engine and flowing in the catalyst. When a work amount of the compressor is increased due to the after-injection performed by the after-injection performing means, the turbine rotation energy amount adjusting means decreases the amount of energy of the exhaust gas, which is used for rotating the turbine, in order to decrease the increased work amount to zero.

In such an internal combustion engine provided with the supercharger in the exhaust passage at the position upstream of the catalyst, even in a case where the after-injection performing means performs the after-injection so as to increase the temperature of the exhaust gas released from the internal combustion engine, if part of energy of the exhaust gas is used for increasing the rotational speed of the turbine, the temperature of the exhaust gas decreases and the temperature of the exhaust gas flowing in the catalyst is not increased sufficiently.

In contrast to this, the exhaust gas control apparatus for an internal combustion engine according to the first aspect is provided with the turbine rotation energy amount adjusting means for adjusting the amount of exhaust gas used for rotating the turbine. When the work amount of the compressor is increased by performing after-injection, the turbine rotation energy amount adjusting means determines that part of the energy of the exhaust gas, which has been increased by the after-injection, is used for increasing the rotational speed of the turbine, and decreases the amount of energy of the exhaust gas, which is used for rotating the turbine, in order to decrease the increased work amount to zero. It is therefore possible to efficiently use the energy of the exhaust gas, which has been increased by the after-injection, for increasing the temperature of the catalyst. Also, the amount of energy of the exhaust gas, which is used for rotating the turbine, is decreased in order to decrease the work amount of the compressor, which has been increased by performing the after-injection, to zero, that is, in order to make the work amount of the compressor equal to a value detected before the after-injection is performed. Accordingly, the intake air amount does not become smaller than that before the after-injection is performed. It is therefore possible to prevent the situation in which the amount of smoke increases due to an excessive decrease in the amount of energy of the exhaust gas, which is used for rotating the turbine.

The turbine rotation energy amount adjusting means may decrease the amount of energy of the exhaust gas, which is used for rotating the turbine, by increasing an opening amount of a variable nozzle provided in the supercharger and/or an opening amount of a wastegate valve.

When the opening amount of the variable nozzle is increased, a cross sectional area of a nozzle passage is increased. Accordingly, a flow speed and a pressure of the exhaust gas flowing through the nozzle passage are decreased, and therefore the amount of energy of the exhaust gas, which is used for rotating the turbine, is decreased. Meanwhile, when the opening amount of the wastegate valve is increased, the amount of the exhaust gas itself used for rotating the turbine is decreased. Accordingly, the amount of energy of the exhaust gas, which is used for rotating the turbine, is decreased. Increasing the opening amounts of the variable nozzle and the wastegate valve makes it possible to introduce the exhaust gas to the catalyst without decreasing the amount of energy of the exhaust gas. Therefore, the energy of the exhaust gas, whose amount has been increased due to the after-injection, can be efficiently used for increasing the temperature of the catalyst.

The after-injection performing means may decide an amount of fuel injected by the after-injection based on a temperature at which the catalyst is activated. The turbine rotation energy amount adjusting means may increase the opening amount of the variable nozzle provided in the supercharger and/or the opening amount of the wastegate valve as the amount of fuel injected by the after-injection increases.

For example, the after-injection performing means may decide the amount of fuel injected by the after-injection based on a difference between the temperature at which the catalyst is activated and an actually detected temperature of the exhaust gas flowing in the catalyst before the after-injection is performed, or a difference between the temperature at which the catalyst is activated and a temperature of the exhaust gas flowing in the catalyst, which is estimated based on an operating state of the internal combustion engine before the after-injection is performed.

In the case where the opening amount of the variable nozzle is equal to the opening amount of the wastegate valve, as the amount of fuel injected by the after-injection increases, the amount of energy of the exhaust gas, which is generated by the after-injection, increases. Accordingly, the amount of energy used for rotating the turbine also increases. Therefore, by increasing the opening amount of the variable nozzle or the wastegate valve as the amount of fuel injected by the after-injection increases, the energy of the exhaust gas, whose amount has been increased due to the after-injection, can be efficiently used for increasing the temperature of the catalyst.

At least one of intake air amount detecting means for detecting an amount of intake air flowing through an intake passage of the internal combustion engine and intake air pressure detecting means for detecting a pressure of the intake air may be further provided in the intake passage of the internal combustion engine. The turbine rotation energy amount adjusting means may decrease the amount of energy of the exhaust gas, which is used for rotating the turbine, when a value detected by the intake air amount detecting means or the intake air pressure detecting means after the after-injection is performed is higher than a value detected by the intake air amount detecting means or the intake air pressure detecting means before the after-injection is performed.

Using the intake air amount detecting means or the intake air pressure detecting means makes it possible to easily and accurately determine whether the work amount of the compressor is increased by performing the after-injection. Therefore, when the value detected by the intake air amount detecting means or the intake air pressure detecting means after the after-injection is performed is higher than that before the after-injection is performed, by decreasing the amount of exhaust gas used for rotating the turbine, the energy of the exhaust gas, whose amount has been increased due to the after-injection, can be efficiently used for increasing the temperature of the catalyst.

As described so far, with the exhaust gas control apparatus for an internal combustion engine according to the first aspect of the invention, the energy of the exhaust gas can be efficiently used without deteriorating the properties of exhaust emissions.

According to a second aspect of the invention, there is provided an exhaust gas control method for an internal combustion engine provided with a catalyst which is provided in an exhaust passage of an internal combustion engine and which has an oxidizing ability; a supercharger which includes a turbine that is provided in the exhaust passage at a position upstream of the catalyst and that is rotated by exhaust gas and a compressor that is rotated in accordance with rotation of the turbine and that performs supercharging; turbine rotation energy amount adjusting means for adjusting an amount of energy of the exhaust gas, which is used for rotating the turbine; and after-injection performing means for performing after-injection for injecting fuel after main fuel injection in order to increase a temperature of the exhaust gas released from the internal combustion engine and flowing in the catalyst. When a work amount of the compressor is increased due to the after-injection performed by the after-injection performing means, the turbine rotation energy amount adjusting means decreases the amount of energy of the exhaust gas, which is used for rotating the turbine, in order to decrease the increased work amount to zero.

BRIEF DESCRIPTION OF THE DRAWINGS

The above-mentioned objects, features, advantages, technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

Hereafter, a preferred embodiment of the invention will be described in detail with reference to accompanying drawings. Note that, unless otherwise specified, the scope of the invention is not limited to sizes, materials, forms and arrangements of components disclosed in the embodiment.

Figure 1:
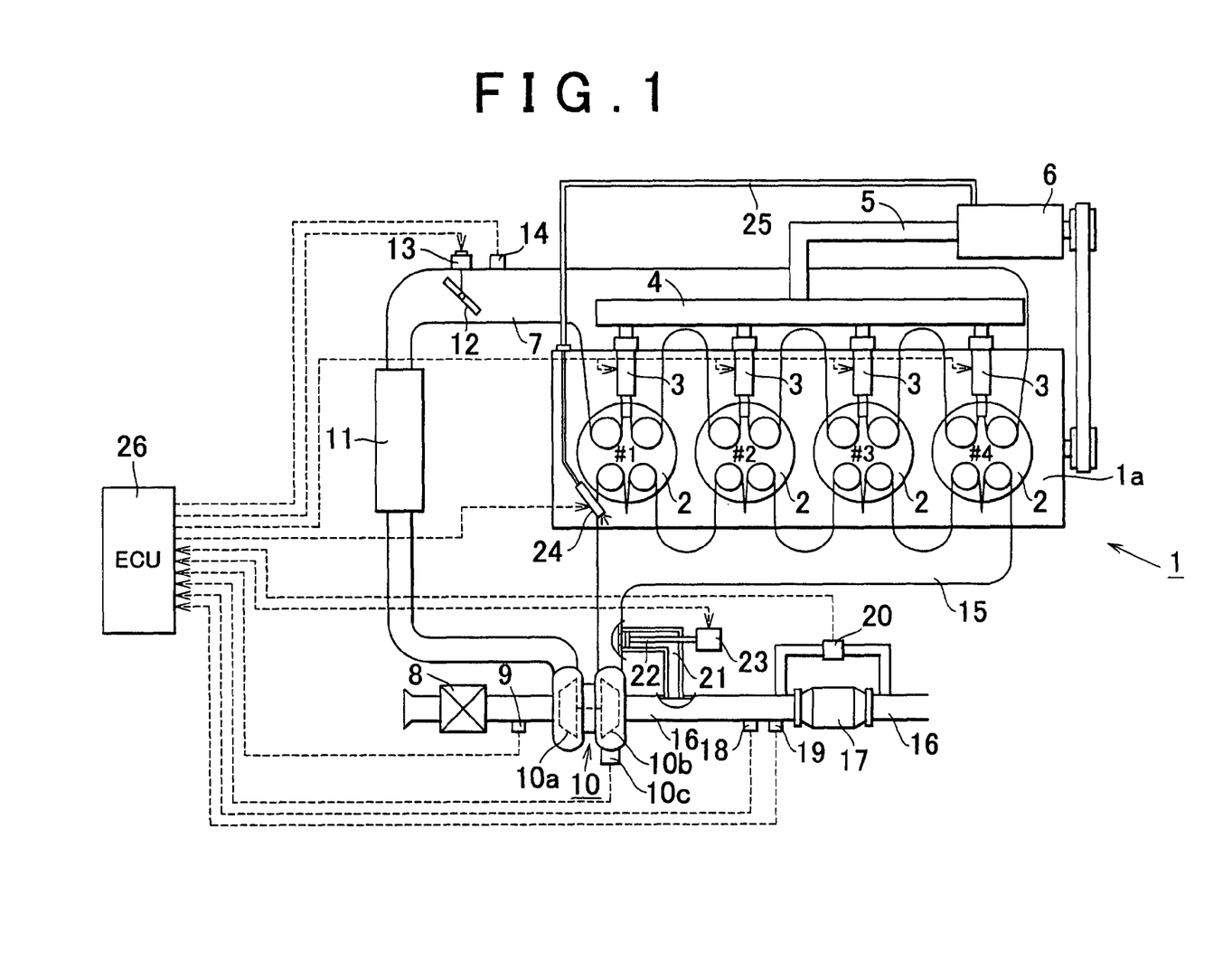
FIG. 1 is a view schematically showing a structure of an internal combustion engine and an intake and exhaust system to which an exhaust gas control apparatus for an internal combustion engine according to an embodiment of the invention is applied.

FIG. 1 is a view schematically showing a structure of an internal combustion engine and an intake and exhaust system to which an exhaust gas control apparatus according to an embodiment of the invention is applied.

An internal combustion engine 1 shown in FIG. 1 is a water-cooled four-stroke diesel engine including four cylinders 2. The internal combustion engine 1 includes fuel injection valves 3 which directly inject fuel to combustion chambers of the respective cylinders 2. Each fuel injection valve 3 is connected to an accumulator (common rail) 4, and the common rail 4 is communicated with a fuel pump 6 through a fuel supply pipe 5.

An intake passage 7 is connected to the internal combustion engine 1, and the intake passage 7 is connected to an air cleaner box 8. An airflow meter 9, which outputs an electric signal corresponding to a mass of intake air flowing in the intake passage, is attached to the intake passage 7 at a position downstream of the air cleaner box 8.

A compressor housing 10a of a supercharger 10 is provided in the intake passage 7 at a position downstream of the air flow meter 9. An intercooler 11 is attached to the intake passage 7 at a position downstream of the compressor housing 10a. In addition, an intake throttle valve 12, which adjusts a flow amount of the intake air flowing in the intake passage 7, is provided in the intake passage 7 at a position downstream of the intercooler 11. An intake throttle actuator 13 is attached to the intake throttle valve 12. Also, a pressure sensor 14, which outputs an electric signal corresponding to a pressure of compressed air in the intake passage 7, that is, a so-called supercharging pressure, is attached to the intake passage 7 at a position downstream of the intake throttle valve 12.

An exhaust branch pipe 15, in which four branch pipes are united to one collecting pipe, is coupled with the internal combustion engine 1. The branch pipes of the exhaust branch pipe 15 are communicated with the combustion chambers of the respective cylinders 2 through respective exhaust ports. Then, the collecting pipe of the exhaust branch pipe 15 is connected to an exhaust pipe 16 through a turbine housing 10b of the supercharger 10. The exhaust pipe 16 is connected to a muffler (not shown) on the downstream side. Thus, the exhaust branch pipe 15 and the exhaust pipe 16 serve as an exhaust passage.

Also, a particulate filter 17 supporting a storage reduction type NOx catalyst (hereinafter, referred to as a "NOx catalyst") is provided in the exhaust pipe 16 at a position downstream of the turbine housing 10b. An air-fuel ratio sensor 18 which outputs an electric signal corresponding to an air-fuel ratio of the exhaust gas flowing through the exhaust pipe 16, and an exhaust gas temperature sensor 19 which outputs an electric signal corresponding to a temperature of the exhaust gas flowing through the exhaust pipe 16 are attached to the exhaust pipe 16 at positions upstream of the filter 17. In addition, a pressure difference sensor 20 is provided which outputs an electric signal corresponding to a difference in the pressure in the exhaust pipe 16 between a position upstream of the filter 17 and a position downstream of the filter 17.

In the embodiment, the supercharger 10 is a variable nozzle (VN) type centrifugal supercharger (variable nozzle type turbocharger) which operates using heat energy of the exhaust gas released from the internal combustion engine 1 as a drive power source. A turbine coupled with the compressor is rotatably housed in the turbine housing 10b, and the turbine is rotated by receiving pressure of the exhaust gas.

In addition, a nozzle vane which changes a cross sectional area of the exhaust passage (nozzle passage) in the turbine housing 10b is provided in the turbine housing 10b. The nozzle vane is opened/closed by a NV actuator 10c.

When an opening amount of the nozzle vane (hereinafter, referred to as a "NV opening amount") is decreased by the NV actuator 10c, the cross sectional area of the nozzle passage is decreased. Accordingly, the flow speed and the pressure of the exhaust gas flowing through the nozzle passage are increased, and therefore the rotational speed and the rotating torque of the turbine are increased.

On the other hand, when the NV opening amount is increased by the NV actuator 10c, the cross sectional area of the nozzle passage is increased. Accordingly the flow speed and the pressure of the exhaust gas flowing through the nozzle passage are decreased, and therefore excessive increases in the rotational speed and the rotating torque of the turbine are suppressed.

Accordingly, when the internal combustion engine 1 is operating at a low rotational speed, namely, when the flow speed and the pressure of the exhaust gas released from the internal combustion engine 1 are decreased, the rotational speed and the rotating torque of the turbine can be increased by decreasing the VN opening amount, whereby the supercharging pressure of the intake air can be increased.

On the other hand, when the internal combustion engine 1 is operating at a high rotational speed, namely, when the flow speed and the pressure of the exhaust gas released from the internal combustion engine 1 are increased, excessive increases in the rotational speed and the rotating torque of the turbine can be suppressed by increasing the VN opening amount, whereby an excessive increase in the supercharging pressure of the intake air can be suppressed.

Also, communication between the exhaust branch pipe 15 and the exhaust pipe 16 is permitted through a bypass passage 21, and a wastegate (W/G) valve 22, which opens/closes an open end of the bypass passage 21 on the exhaust branch pipe 15 side, is attached to the bypass passage 21. The wastegate valve 22 is opened/closed by a W/G valve actuator 23 including a solenoid switch, an electric motor and the like.

When an opening amount of the wastegate valve 22 (hereinafter, referred to as a "W/G valve opening amount") is increased by the W/G valve actuator 23, part of the exhaust gas flowing through the exhaust branch pipe 15 flows to the exhaust pipe 16 through the bypass passage 21. Accordingly, the amount of exhaust gas flowing in the turbine housing 10b decreases, and therefore the pressure of the exhaust gas, which is applied to the turbine in the turbine housing 10b, is decreased. As a result, rotational energy transmitted from the turbine to the compressor is also decreased.

Also, a fuel addition valve 24, which adds fuel serving as a reducing agent to the exhaust gas flowing through an exhaust port of a first cylinder (#1) of the internal combustion engine 1, is attached to this exhaust port. The fuel addition valve 24 is connected to the fuel pump 6 through a fuel passage 25.

The thus configured internal combustion engine 1 is provided with an electronic control unit (ECU) 26 for controlling the internal combustion engine 1. The ECU 26 is an arithmetic and logical unit including a CPU, ROM, RAM, backup RAM, and the like.

The ECU 26 is connected to the air flow meter 9, the intake air pressure sensor 14, the air-fuel ratio sensor 18, the exhaust gas temperature sensor 19, and the pressure difference sensor 20 and also connected to various sensors such as a crank position sensor (not shown) and a coolant sensor (not shown) attached to the internal combustion engine 1, and an accelerator pedal position sensor (not shown) provided in a vehicle compartment of the vehicle including the internal combustion engine, via electric wiring. Signals output from the various sensors are input in the ECU 26.

Also, the ECU 26 is connected to the fuel injection valve 3, the VN actuator 10c, the intake throttle actuator 13, the W/G valve actuator 23, the fuel addition valve 24 and the like, via electric wiring. Thus, the ECU 26 can control the fuel injection valve 3, the VN actuator 10c, the intake throttle actuator 13, the W/G valve actuator 23, the fuel addition valve 24, and the like.

For example, the ECU 26 inputs the signals output from the various sensors, and computes the engine rotational speed, the fuel injection amount, and the fuel injection timing in a basic routine performed at predetermined intervals. The signals input in the ECU 26 and the control values obtained by computation performed by the ECU 26 in the basic routine are temporarily stored in the RAM of the ECU 26.

In addition, the ECU 26 reads various control values from the RAM and controls the fuel injection valve 3 and the like based on the control values, in an interrupt process which is triggered by an input of a signal from the various sensors and switches, a lapse of a predetermined period, an input of a pulse signal from the crank position sensor, or the like.

Hereafter, a PM recovery process will be described in detail. If PM is accumulated in the filter 17, an exhaust path in the filter becomes narrower, and resistance to the exhaust gas flowing through the exhaust path increases. If PM is excessively accumulated in the filter 17, the pressure of the exhaust gas increases, which causes a decrease in the output from the internal combustion engine. It is therefore necessary to perform the PM recovery process for oxidizing and removing the PM accumulated in the filter 17 so as to recover the PM collecting ability of the filter 17 at the appropriate time. Accordingly, the ECU 26 performs the PM recovery process in the following manner, when a PM recovery process start condition is satisfied.

An example of the PM recovery process start condition is a condition that an amount of PM accumulated in the filter is equal to or larger than a predetermined value. The predetermined value is set to a value which is slightly smaller than a limit PM accumulation amount at which the accumulated PM causes clogging of the filter, the clogging causes an increase in the resistance to the exhaust gas, and the output from the internal combustion engine is decreased.

Examples of a method of determining whether the amount of PM accumulated in the filter is equal to or larger than the predetermined value are a method in which it is determined that the amount of PM accumulated in the filter is equal to or larger than the predetermined value when a difference in pressure in the exhaust passage (exhaust gas pressure) between a position upstream of the filter 17 and a position downstream of the filter 17, which is calculated based on the value detected by the pressure difference sensor 20, is equal to or larger than a predetermined value, and a method in which it is determined that the amount of PM accumulated in the filter is equal to or larger than the predetermined value when a value obtained by accumulating the fuel injection amount from when the previous PM recovery process ends is equal to or larger than a predetermined value.

When it is determined that the PM recovery process start condition is satisfied according to the above-mentioned method, the ECU 26 performs a filter temperature increasing process for increasing a temperature of the filter to a value in a high temperature range of approximately 500° C. to 700° C., and a lean air-fuel ratio process for making the atmosphere of the exhaust gas flowing in the filter 17 an excessive oxygen atmosphere.

An example of a method of performing the filter temperature increasing process is a method in which post-injection for subsidiarily injecting fuel in the cylinder during an exhaust stroke or a power stroke. In the post injection, the fuel injected in the cylinder during the exhaust stroke or the power stroke flows in the NOx catalyst supported by the filter 17 as unburned fuel, the temperature of the catalyst increases due to reaction heat caused by the catalyst, and therefore the temperature of the filter increases.

However, in an operating region in which the temperature of the exhaust gas released from the internal combustion engine 1 is low, for example, in a low load operating region, the temperature of the NOx catalyst may not reach the temperature at which the NOx catalyst is activated. In such a case, even if the post-injection is performed, the unburned fuel does not easily react, and the temperature of the filter is difficult to increase. Therefore, in such a case, in order to increase the temperature of the NOx catalyst to the temperature at which the NOx catalyst is activated, the ECU 26 which also serves as the after-injection performing means controls the fuel injection valve 3 so as to perform the after-injection. In the after-injection, fuel is injected within a relatively short period after the main injection (in the case where the post injection is performed during the power stroke, the after-injection is performed at time earlier than the post injection timing) and burned in the cylinder, in order to increase the temperature itself of the exhaust gas released from the internal combustion engine 1.

Also, by adding the fuel serving as a reducing agent from the fuel addition valve 24 to the exhaust gas instead of performing the above-mentioned post-injection or in addition to performing the post-injection, the unburned fuel components may be oxidized in the NOx catalyst, and the temperature of the filter may be increased using the heat which is generated due to the oxidation.

Namely, as the filter temperature increasing process, the process in which the post-injection and/or fuel addition by the fuel addition valve 24 are performed in addition to performing the after-injection, and the process in which the post-injection and/or fuel addition by the fuel addition valve 24 are performed without performing the after-injection are selectively performed based on the operating state of the internal combustion engine or the temperature of the exhaust gas detected by the exhaust temperature sensor 19.

The lean air-fuel ratio process is the control for adjusting the amount of fuel injected from the fuel injection valve 3 or the amount of fuel added from the fuel addition valve 24 to the exhaust gas such that the value indicating the signal output from the air-fuel ratio sensor 18 becomes a value corresponding to a lean air-fuel ratio.

Hereafter, the S recovery process will be described in detail. When the air-fuel ratio of the exhaust gas flowing in the catalyst is lean, the NOx catalyst supported by the filter 17 prevents the NOx in the exhaust gas from being released into the atmosphere by storing the NOx therein. When the air-fuel ratio of the exhaust gas flowing in the catalyst becomes the stoichiometric air-fuel ratio or a rich air-fuel ratio, the NOx catalyst supported by the filter 17 removes the stored NOx by releasing and reducing the NOx.

A sulfur (S) component is contained in the fuel or oil, and the S component reacts with oxygen to form sulfur oxide (SOx). Since the NOx catalyst stores the SOx in the exhaust gas by the same mechanism as NOx storage, when the amount of SOx stored in the NOx catalyst increases, the NOx removing ability of the NOx catalyst is decreased, namely, so-called S poisoning occurs.

When the S poisoning occurs in the NOx catalyst, the NOx removing ability is decreased, and the NOx contained in the exhaust gas may be released into the atmosphere without being removed in the NOx catalyst 15. Accordingly, in the embodiment, the S recovery process for releasing and reducing the SOx stored in the NOx catalyst so as to remove the SOx and recovering the NOx removing ability of the NOx catalyst is performed. Therefore, the ECU 26 performs the S recovery process in the following manner when a S recovery process start condition is satisfied.

Examples of the S recovery process start condition is a condition that a predetermined period has elapsed since the previous S recovery process ends, and a condition that the vehicle has traveled a predetermined distance since the previous S recovery process ends.

When it is determined that the S recovery process start condition is satisfied, the ECU 26 performs a catalyst temperature increasing process for increasing a bed temperature of the NOx catalyst to a value in the range of 500° C. to 700° C., and performs a rich air-fuel ratio process for making the air-fuel ratio of the exhaust gas flowing in the NOx catalyst rich.

Since the catalyst temperature increasing process is the same as the above-mentioned filter temperature increasing process, the detailed description thereof is not made here. The rich air-fuel ratio process is the control for adjusting the amount of fuel injected from the fuel injection valve 3 or the amount of fuel added from the fuel addition valve 24 to the exhaust gas such that the value indicating the signal output from the air-fuel ratio sensor 18 becomes a value corresponding to a rich air-fuel ratio.

When the above-mentioned PM recovery process or S recovery process is performed, the filter temperature increasing process or the catalyst temperature increasing process is performed. In each of the filter temperature increasing process and the catalyst temperature increasing process, in order to increase the temperature of the filter 17, the after-injection may be performed so as to increase the temperature of the exhaust gas released from the internal combustion engine 1.

As mentioned above, the turbine housing 10b is provided in the exhaust pipe 16 at a position upstream of the filter 17, and the turbine rotatably provided in the turbine housing 10b rotates by receiving the pressure of the exhaust gas. Namely, part of the energy of the exhaust gas is used as the energy for rotating the turbine. Therefore, the temperature of the exhaust gas released from the internal combustion engine 1 decreases according to the amount of energy used for rotating the turbine.

Accordingly, even when the above-mentioned after-injection is performed, the temperature of the exhaust gas is decreased according to the amount of energy used for rotating the turbine, and the fuel gas having the decreased temperature flows in the filter 17. In such a case, the rotational speed of the turbine increases according to the amount of increase in rotational energy of the turbine due to the after-injection, and the rotational speed of the compressor also increases. As a result, the intake air amount becomes larger than that before the after-injection is performed, and the amount of exhaust gas released from the internal combustion engine 1 also increases. Therefore, the amount of exhaust gas flowing in the filter 17 also increases. Then, the temperature of the filter 17 is decreased by the exhaust gas flowing in the filter 17. Accordingly, although the after-injection is performed, it becomes difficult to increase the temperature of the filter 17.

Hereafter, the recovery process control will be described in detail. When the PM recovery process or the S recovery process according to the embodiment is performed, if the temperature of the exhaust gas flowing in the filter 17 does not reach a desired value even when the after-injection is performed, the VN opening amount or the W/G valve opening amount is adjusted such that the temperature of the exhaust gas becomes the desired value.

The temperature of the exhaust gas flowing in the filter 17 does not reach the desired value even if the after-injection is performed, because the energy of the exhaust gas, which has been increased by performing the after-injection, is used for rotating the turbine. Whether the energy is used for rotating the turbine is determined based on whether the work amount of the compressor is increased by performing the after-injection, that is, whether the intake air amount becomes larger than that before the after-injection is performed, or whether the intake air pressure becomes higher than that before the after-injection is performed.

In order to prevent the temperature of the exhaust gas flowing in the filter 17 from decreasing in the turbine housing 10b, the nozzle vane or the wastegate valve 22 is preferably fully opened. However, as the opening amount increases, the supercharging pressure decreases and therefore the intake air amount decreases, which may cause an increase in the amount of smoke. Therefore, in the embodiment, the opening amount is adjusted to a value at which a desired temperature can be obtained.

Figure 2A:
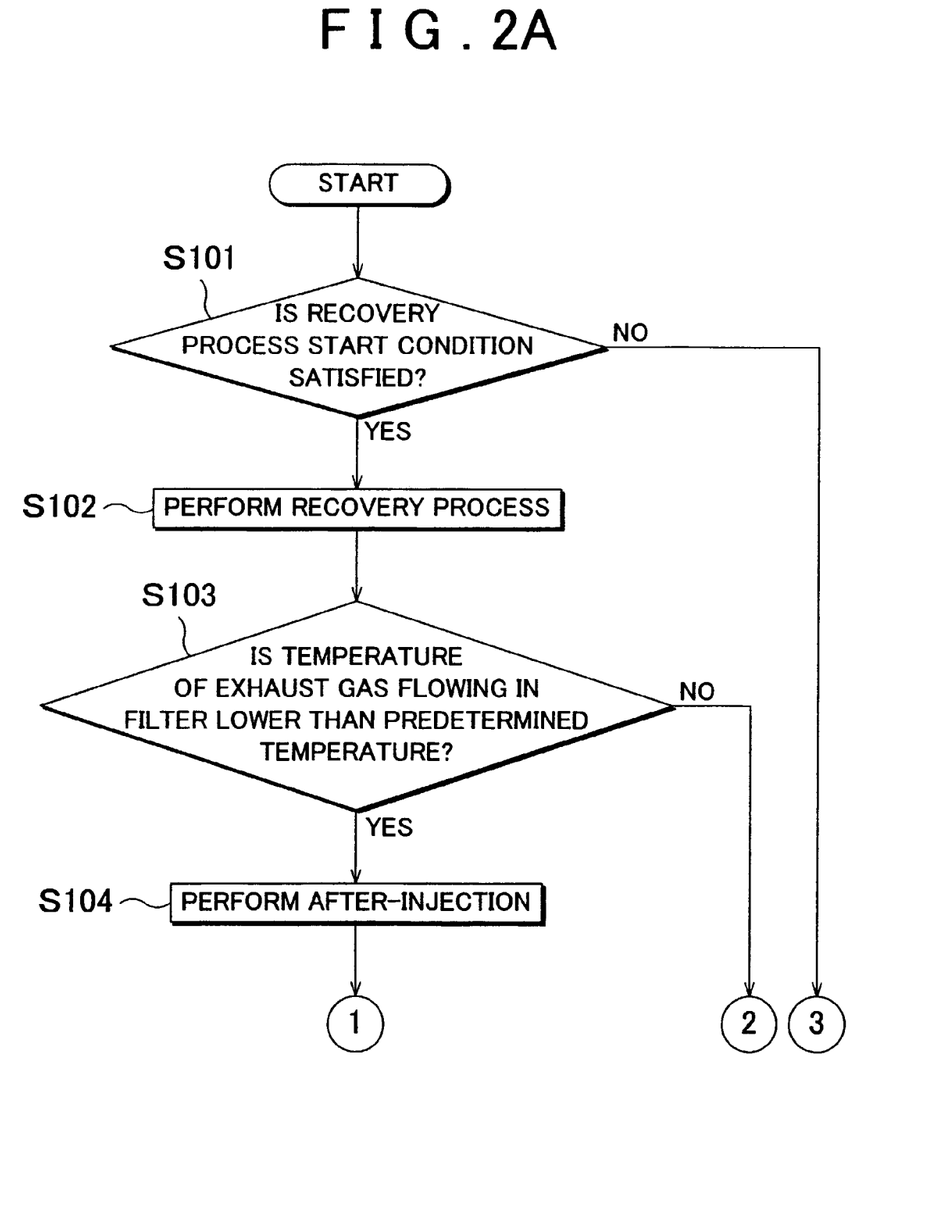
FIG. 2A and FIG. 2B are a flowchart of recovery process control according to the embodiment.
Figure 2B:
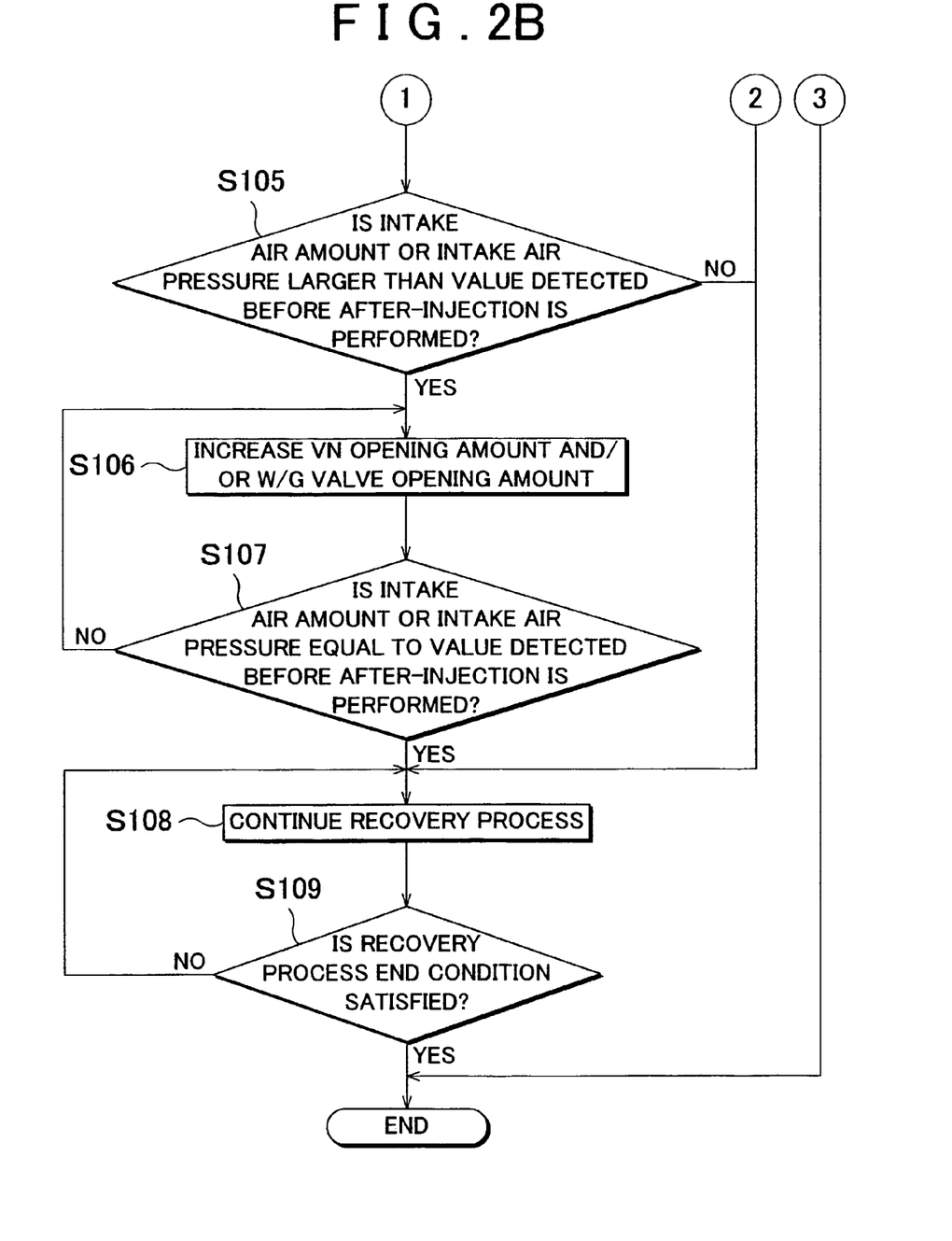

Hereafter, the recovery process control according to the embodiment will be described in detail with reference to a flowchart shown in FIGS. 2A and 2B. The control routine is stored in the ROM of the ECU 26 in advance, and performed by the ECU 26 as the interrupt process which is triggered by a lapse of a predetermined period, an input of a pulse signal from the crank position sensor, or the like.

In the routine, the ECU 26 initially determines in step S101 whether the above-mentioned recovery process start condition is satisfied. Namely, the ECU 26 determines whether the above-mentioned PM recovery process start condition is satisfied when the PM recovery process is performed, and the ECU 26 determines whether the above-mentioned S recovery process start condition is satisfied when the S recovery process is performed. When an affirmative determination is made in step S101, step S102 is then performed. On the other hand, when a negative determination is made in step S101, the routine ends.

In step S102, the recovery process is performed. When the PM recovery process is performed, as mentioned above, the filter temperature increasing process is performed and the lean air-fuel ratio process is also performed. When the S recovery process is performed, as mentioned above, the catalyst temperature increasing process is performed, and the rich air-fuel ratio process is also performed.

Step S103 is then performed, in which the ECU 26 determines whether the temperature of the exhaust gas flowing in the filter 17, which is detected by the exhaust gas temperature sensor 19, is lower than a predetermined temperature. For example, the predetermined temperature may be a temperature equal to the temperature at which the NOx catalyst supported by the filter 17 is activated. When an affirmative determination is made, in order to make the temperature of the NOx catalyst equal to the temperature at which the NOx catalyst is activated by increasing the temperature of the exhaust gas flowing in the filter 17, step S104 is performed, in which after-injection is performed. On the other hand, when a negative determination is made in step S103, it can be determined that the NOx catalyst has been activated. Therefore, step S108 is performed and the recovery process is continued. The amount of fuel injected by the after-injection performed in step S104 is decided based on the exhaust gas temperature detected by the exhaust gas temperature sensor 19 and the operating state of the internal combustion engine 1.

In step S105, the ECU 26 determines whether the intake air amount detected by the air flow meter 9 or the intake air pressure detected by the pressure sensor 14 has become larger than that before the after-injection is performed. When an affirmative determination is made in step S105, step S106 is performed, in which the VN opening amount and/or the W/G valve opening amount are/is (for the sake of simplicity, hereinafter, "are" will be used in place of "are/is") increased, since part of the energy of the exhaust gas, which has been increased by the after-injection, is used for rotating the turbine, the temperature of the exhaust gas flowing in the NOx catalyst has not reach the predetermined temperature, and therefore the temperature of the NOx catalyst has not been increased to the temperature at which the NOx catalyst is activated. On the other hand, when a negative determination is made in step S105, step S108 is then performed and the recovery process is continued without changing the VN opening amount and/or the W/G valve opening amount, since the energy of the exhaust gas, which has been increased by the after-injection, is efficiently used for increasing the temperature of the NOx catalyst to the temperature at which the NOx catalyst is activated at the present VN opening amount and W/G valve opening amount.

Depending on the operating state of the internal combustion engine 1, the value detected by the air flow meter 9 or the pressure sensor 14 is not stable. Accordingly, in the step, the ECU 26 may determine whether the intake air amount detected by the air flow meter 9 or the intake air pressure detected by the pressure sensor 14 has increased from the value detected before the after-injection is performed by an amount that is larger than the upper limit of a predetermined range.

In step S106, the VN opening amount and/or the W/G valve opening amount are increased by controlling the VN actuator 10c and/or the W/G valve actuator 23. Which of the VN opening amount and the W/G valve opening amount is changed, or whether both the VN opening amount and the WIG valve opening amount are changed is decided in advance based on the specifications of the internal combustion engine 1. Also, there is a correlation between the intake air amount or the intake air pressure, which has been increased by the after-injection, and the amount of change in the VN opening amount and/or the amount of change in the W/G valve opening amount. Therefore, the correlation is obtained in advance and stored in the ROM as a map. In step S106, the amount of change in the VN opening amount and/or the amount of change in the W/G valve opening amount are calculated based on the map and the increased intake air amount or the increased intake air pressure, and the opening amounts are increased by the calculated value. Also, the amount of change in the VN opening amount and/or the amount of change in the W/G valve opening amount may be corrected based on the amount of fuel injected by the after-injection performed in step S104. Namely, the amounts of changes are corrected such that the amount of change in the VN opening amount and/or the amount of change in the W/G valve opening amount are increased as the amount of fuel injected by the after-injection is increased. Thus, step S106 functions as the turbine rotation energy amount adjusting means.

Then, Step S107 is performed, in which the ECU 26 determines whether the intake air amount detected by the air flow meter 9 or the intake air pressure detected by the pressure sensor 14 becomes equal to the value detected before the after-injection is performed. When an affirmative determination is made, step S108 is then performed and the recovery process is continued, since it can be considered that the energy of the exhaust gas, which has been increased by the after-injection, is efficiently used for increasing the temperature of the NOx catalyst to the temperature at which the NOx catalyst is activated. On the other hand, when a negative determination is made, step S106 is performed again, since it can be considered that part of the energy of exhaust gas, which has been increased by the after-injection, is still used for rotating the turbine, the temperature of the exhaust gas flowing in the NOx catalyst has not reach the predetermined value, and the temperature of the NOx catalyst has not been increased to the temperature at which the NOx catalyst is activated.

In this step, the ECU 26 may determine whether the intake air amount detected by the air flow meter 9 or the intake air pressure detected by the pressure sensor 14 has been changed from the value detected before the after-injection is performed by a change amount within a predetermined range.

In step S108, the recovery process is continued. Step S108 is performed, because the temperature of the NOx catalyst has reached the temperature at which the NOx catalyst is activated. Therefore, in the temperature increasing process, the post-injection and/or the fuel addition by the fuel addition valve 14 are performed without performing the after-injection.

In step S109, the ECU 26 determines whether the recovery process end condition is satisfied. In the case of the PM recovery process, examples of the recovery process end condition are a condition that the difference in pressure in the exhaust passage between a position upstream of the filter 17 and a position downstream of the filter 17, which is calculated based on the value detected by the pressure difference sensor 20, is equal to or lower than a predetermined value, and a condition that a predetermined period has elapsed since the PM recovery process is started. In the case of the S recovery process, an example of the recovery process end condition is a condition that a predetermined period has elapsed since the S recovery process is started. When an affirmative determination is made in step S109, the routine ends. On the other hand, when a negative determination is made in step S109, step S108 is performed in order to continue the recovery process until the recovery process end condition is satisfied.

Performing such recovery process control makes it possible to efficiently use the energy of the exhaust gas, which has been increased by the after-injection, for increasing the temperature of the NOx catalyst. The VN opening amount and/or the W/G valve opening amount are increased so as to decrease the amount of energy of the exhaust gas, which is used for rotating the turbine, in order to make the intake air amount detected by the air flow meter 9 or the intake air pressure detected by the pressure sensor 14 equal to the value detected before the after-injection is performed, namely, in order to decrease the work amount of the compressor, which has been increased by performing the after-injection, to zero. Accordingly, the intake air amount does not become smaller than that before the after-injection is performed. Therefore, it is possible to prevent the situation in which the amount of smoke is increased due to an excessive decrease in the amount of energy of the exhaust gas, which is used for rotating the turbine.

In the above-mentioned recovery process control, it is determined whether the VN opening amount and/or the W/G valve opening amount are changed based on a change in the intake air amount or the intake air pressure. However, it may be determined whether the VN opening amount and/or the W/G valve opening amount are changed based on the temperature of the exhaust gas flowing in the filter 17, which is detected by the exhaust gas temperature sensor 19.

Figure 3A:
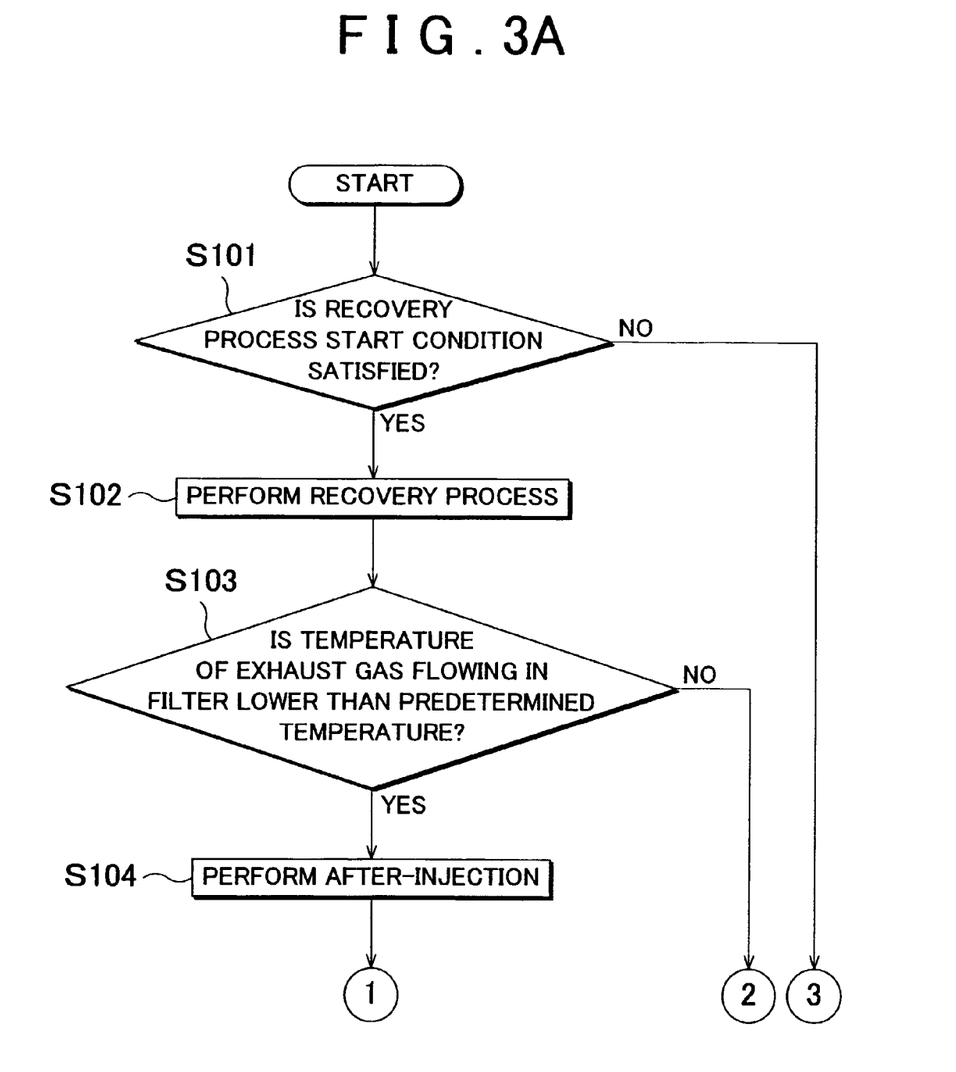
FIG. 3A and FIG. 3B are a flowchart of another recovery process control according to the embodiment.
Figure 3B:
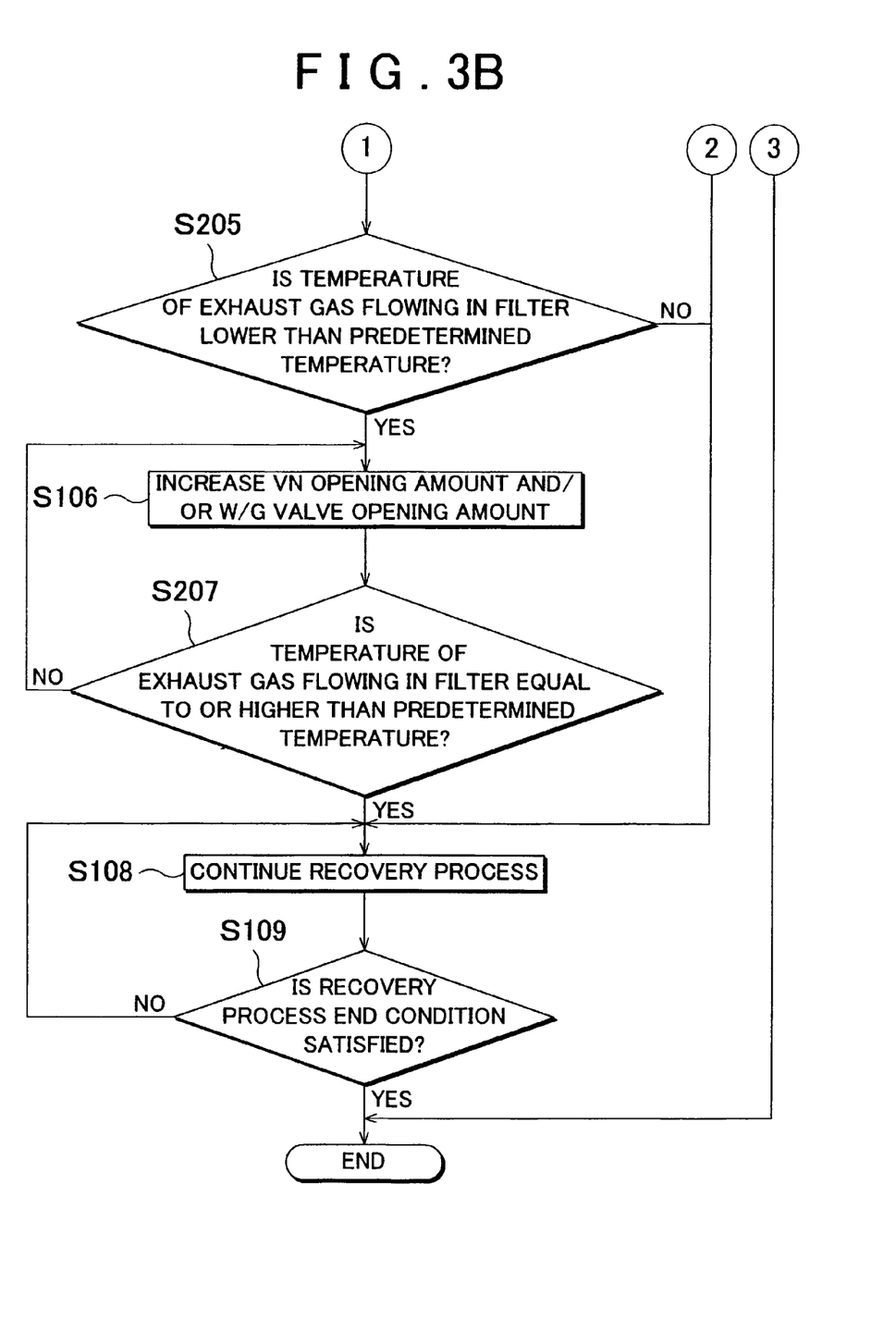

FIGS. 3A and 3B show a flowchart used in such a case. The flowchart shown in FIGS. 3A and 3B is the same as the flowchart shown in FIGS. 2A and 2B except for steps S205 and S207. Therefore, the following description will be made concerning only steps S205 and S107. The other steps are shown by the same reference numerals, and the description thereof is not made here.

In step S105, the ECU 26 determines whether the temperature of the exhaust gas flowing in the filter 17, which is detected by the exhaust gas temperature sensor 19, is lower than the predetermined value. When an affirmative determination is made, step S106 is performed, in which the VN opening amount and/or the W/G valve opening amount are increased, since it is considered that part of the energy of the exhaust gas, which has been increased by the after-injection, is used for rotating the turbine and therefore the temperature has not reached the predetermined value. On the other hand, when a negative determination is made, step S108 is performed and the recovery process is continued without changing the VN opening amount and/or the W/G valve opening amount, since it is considered that the energy of the exhaust gas, which has been increased by the after-injection, can be efficiently used for increasing the temperature of the NOx catalyst at the present VN opening amount and W/G valve opening amount.

In step S207, the ECU 26 determines whether the temperature of the exhaust gas flowing in the filter 17, which is detected by the exhaust gas temperature sensor 19, is equal to or higher than the predetermined value. When an affirmative determination is made, step S108 is performed and the recovery process is continued. On the other hand, when a negative determination is made, step S106 is performed again, since it is considered that part of the energy of the exhaust gas, which has been increased by the after-injection, is still used for rotating the turbine and therefore the temperature of the exhaust gas flowing in the NOx catalyst has not reached the predetermined value.

Even in such a case, it is possible to prevent the situation in which the amount of smoke is increased due to an excessive decrease in the amount of energy of the exhaust gas, which is used for rotating the turbine. It is also possible to efficiently use the energy of the exhaust gas, which has been increased by the after-injection, for increasing the temperature of the NOx catalyst.

It is to be understood that "storage" used herein means retention of a substance (solid, liquid, gas molecules) in the form of at least one of adsorption, adhesion, absorption, trapping, occlusion, and others.

The invention claimed is:

1. An exhaust gas control method for an internal combustion engine including a catalyst which is provided in an exhaust passage of the internal combustion engine and which has an oxidizing ability; a supercharger which includes a turbine that is provided in the exhaust passage at a position upstream of the catalyst and that is rotated by exhaust gas, and a compressor that is rotated in accordance with rotation of the turbine and that performs supercharging; a turbine rotation controller that adjusts an amount of energy of the exhaust gas, which is used for rotating the turbine; an injection controller that performs after-injection for injecting fuel after main fuel injection in order to increase a temperature of the exhaust gas released from the internal combustion engine and flowing in the catalyst, the method comprising:

decreasing an amount of energy taken from the exhaust gas for rotating the turbine when a work amount of the compressor is increased due to the after-injection performed by the injection controller in order to decrease the increase in the work amount due to the after injection to zero.

2. The exhaust gas control method according to claim 1, further comprising increasing at least one of an opening amount of a variable nozzle provided in the supercharger and an opening amount of a wastegate valve to decrease the amount of energy of the exhaust gas, which is used for rotating the turbine.

3. The exhaust gas control method according to claim 2, further comprising:

deciding an amount of fuel injected by the after-injection based on a temperature at which the catalyst is activated, and increasing the at least one of the opening amount of the variable nozzle provided in the supercharger and the opening amount of the wastegate valve as the amount of fuel injected by the after-injection increases.

4. The exhaust gas control method according to claim 1, further comprising:

detecting at least one of an amount of intake air flowing through an intake passage of the internal combustion engine via an intake air amount detector and detecting a pressure of the intake air in the intake passage of the internal combustion engine via an intake air pressure detector, and decreasing the amount of energy of the exhaust gas, which is used for rotating the turbine, when a value detected by the intake air amount detector or the intake air pressure detector after the after-injection is performed is higher than a value detected by the intake air amount detector or the intake air pressure detector before the after-injection is performed.

5. An exhaust gas control apparatus for an internal combustion engine, comprising:
- a catalyst which is provided in an exhaust passage of the internal combustion engine and which has an oxidizing ability;
- a supercharger which includes a turbine that is provided in the exhaust passage at a position upstream of the catalyst and that is rotated by exhaust gas, and a compressor that is rotated in accordance with rotation of the turbine and that performs supercharging;
- turbine rotation energy amount adjusting means for adjusting an amount of energy of the exhaust gas, which is used for rotating the turbine; and
- after-injection performing means for performing after-injection for injecting fuel after main fuel injection in order to increase a temperature of the exhaust gas released from the internal combustion engine and flowing in the catalyst, wherein when a work amount of the compressor is increased due to the after-injection performed by the after-injection performing means, the turbine rotation energy amount adjusting means decreases the amount of energy taken from the exhaust gas for rotating the turbine in order to decrease the increase in the work amount due to the after injection to zero.

6. An exhaust gas control apparatus for an internal combustion engine, comprising:
- a catalyst which is provided in an exhaust passage of the internal combustion engine and which has an oxidizing ability;
- a supercharger which includes a turbine that is provided in the exhaust passage at a position upstream of the catalyst and that is rotated by exhaust gas, and a compressor that is rotated in accordance with rotation of the turbine and that performs supercharging;
- a turbine rotation controller that adjusts an amount of energy of the exhaust gas, which is used for rotating the turbine; and
- an injection controller that performs after-injection for injecting fuel after main fuel injection in order to increase a temperature of the exhaust gas released from the internal combustion engine and flowing in the catalyst, wherein when a work amount of the compressor is increased due to the after-injection performed by the injection controller, the turbine rotation controller decreases the amount of energy taken from the exhaust gas for rotating the turbine in order to decrease the increase in the work amount due to the after injection to zero.

7. The exhaust gas control apparatus according to claim 6, wherein the turbine rotation controller decreases the amount of energy of the exhaust gas, which is used for rotating the turbine, by increasing an opening amount of a variable nozzle provided in the supercharger and/or an opening amount of a wastegate valve.

8. The exhaust gas control apparatus according to claim 7, wherein the injection controller decides an amount of fuel injected by the after-injection based on a temperature at which the catalyst is activated, and
- wherein the turbine rotation controller increases the opening amount of the variable nozzle provided in the supercharger and/or the opening amount of the wastegate valve as the amount of fuel injected by the after-injection increases.

9. The exhaust gas control apparatus according to claim 6, wherein at least one of an intake air amount detector that detects an amount of intake air flowing through an intake passage of the internal combustion engine and an intake air pressure detector that detects a pressure of the intake air is further provided in the intake passage of the internal combustion engine, and
- wherein the turbine rotation controller decreases the amount of energy of the exhaust gas, which is used for rotating the turbine, when a value detected by the intake air amount detector or the intake air pressure detector after the after-injection is performed is higher than a value detected by the intake air amount detector or the intake air pressure detector before the after-injection is performed.

* * * * *